US011275807B2

(12) United States Patent
Gupta

(10) Patent No.: US 11,275,807 B2
(45) Date of Patent: Mar. 15, 2022

(54) REACT TO LOCATION CHANGES ON WEB PAGES

(71) Applicant: Google LLC, Mountain View, CA (US)

(72) Inventor: Ankit Gupta, Zurich (CH)

(73) Assignee: Google LLC, Mountain View, CA (US)

( * ) Notice: Subject to any disclaimer, the term of this patent is extended or adjusted under 35 U.S.C. 154(b) by 404 days.

(21) Appl. No.: 15/805,277

(22) Filed: Nov. 7, 2017

(65) Prior Publication Data

US 2019/0138618 A1    May 9, 2019

(51) Int. Cl.
    *G06F 16/9537*    (2019.01)
    *G06F 16/248*    (2019.01)
    *G06F 16/958*    (2019.01)
    *G06F 16/9535*    (2019.01)

(52) U.S. Cl.
    CPC ........ *G06F 16/9537* (2019.01); *G06F 16/248* (2019.01); *G06F 16/958* (2019.01); *G06F 16/9535* (2019.01)

(58) Field of Classification Search
    CPC .............. G06F 16/9537; G06F 16/958; G06F 16/9535; G06F 16/248
    See application file for complete search history.

(56) References Cited

U.S. PATENT DOCUMENTS

| | | |
|---|---|---|
| 7,565,157 B1 | 7/2009 | Ortega et al. |
| 8,005,822 B2 | 8/2011 | Rechis et al. |
| 8,135,735 B2 | 3/2012 | Johnson et al. |
| 8,768,932 B1* | 7/2014 | Kacholia ............... G06F 16/951 707/748 |
| 9,014,713 B1 | 4/2015 | Shaw |
| 9,134,137 B2 | 9/2015 | Brush et al. |
| 2008/0162475 A1* | 7/2008 | Meggs ................. G06F 16/951 |
| 2009/0112816 A1* | 4/2009 | Marlow ................. G06F 16/29 |

(Continued)

FOREIGN PATENT DOCUMENTS

EP    2860648 A1    4/2015

OTHER PUBLICATIONS

Is there an ability to filter search results based on geographic location? http://faq.netvibes.com/knowledgebase/articles/370905-is-there-an-ability . . . , Retreived from the Internet Sep. 4, 2017.

(Continued)

*Primary Examiner* — Hosain T Alam
*Assistant Examiner* — Anthony G Gemignani
(74) *Attorney, Agent, or Firm* — Lerner, David, Littenberg, Krumholz & Mentlik, LLP

(57) ABSTRACT

Aspects of the technology enable selective updating of search results and refreshing an entire webpage while minimizing the amount of information transmitted between a client device and a web server. The approach involves determining whether a change in a detected location of the client device would alter the search results or other portions of the webpage. Current and previously received location information is analyzed and compared against a threshold value, which indicates whether there would be a change to location-relevant information. A location signal is provided to the client device based on this analysis, which is used to (Continued)

determine whether to refresh the received search results, to refresh an entire webpage, or to not refresh either the received search results or the entire webpage.

18 Claims, 7 Drawing Sheets

(56) References Cited

U.S. PATENT DOCUMENTS

| | | | | |
|---|---|---|---|---|
| 2010/0211301 A1* | 8/2010 | McClellan | ........... | G08G 1/0104 |
| | | | | 701/119 |
| 2010/0248746 A1 | 9/2010 | Saavedra et al. | | |
| 2011/0276556 A1 | 11/2011 | Meier et al. | | |
| 2012/0254720 A1* | 10/2012 | Hamm | ................. | G06F 16/957 |
| | | | | 715/234 |
| 2012/0323905 A1* | 12/2012 | Qiao | ....................... | G06F 16/36 |
| | | | | 707/723 |
| 2014/0068413 A1* | 3/2014 | Christensen | ........ | G06F 16/9577 |
| | | | | 715/234 |
| 2016/0047671 A1* | 2/2016 | Meisels | .............. | G01C 21/3476 |
| | | | | 701/516 |
| 2016/0239502 A1 | 8/2016 | Alonso et al. | | |

OTHER PUBLICATIONS

Hattori et al., "Context-Aware Query Refinement for Mobile Web Search," Proceedings of the 2007 International Symposium on Applications and the Internet Workshops, IEEE, 2007.

7 Reasons Google Search Results Vary Dramatically, http://www.webpresencesolutions.net/7-reasons-google-search-results-va . . . , Retreived from the Internet Sep. 4, 2017.

International Search Report and Written Opinion for Application No. PCT/US2018/045767, dated Sep. 28, 2018. 12 pages.

International Preliminary Report on Patentability for International Application No. PCT/US2018/045767 dated May 22, 2020. 7 pages.

Office Action for Korean Patent Application No. 10-2019-7034768 dated Dec. 28, 2020. 10 pages.

Office Action for Japanese Patent Application No. 2019-566275 dated Feb. 8, 2021. 5 pages.

First Examination Report for Indian Patent Application No. 201927045571 dated Mar. 1, 2021. 7 pages.

Office Action for Korean Patent Application No. 10-2019-7034768 dated Jul. 8, 2021. 10 pages.

Office Action for European Patent Application No. 18759528.5 dated Jun. 18, 2021. 6 pages.

* cited by examiner

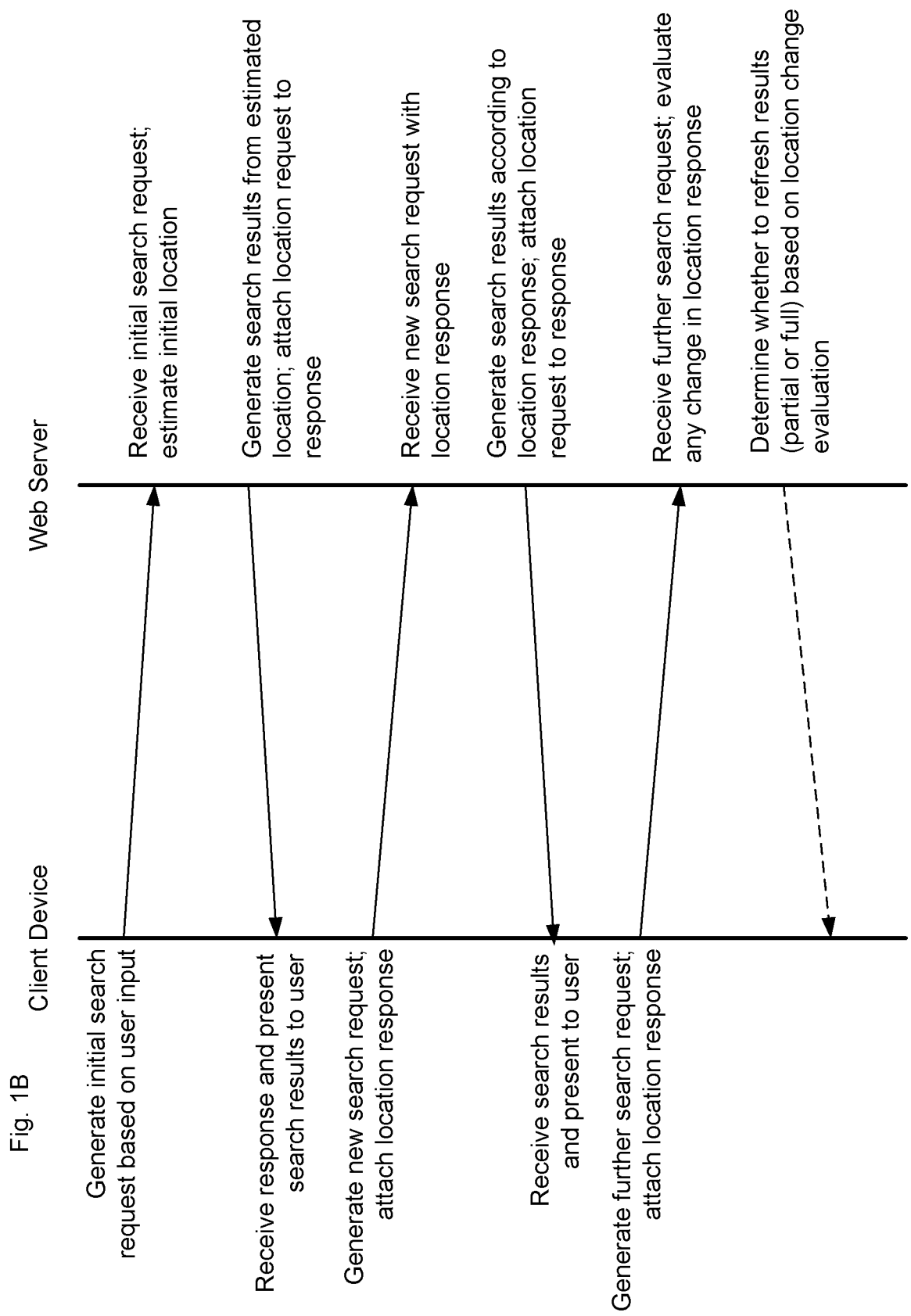

500

REACT TO LOCATION CHANGES ON WEB PAGES

BACKGROUND

In order to provide meaningful search results and other information to a user of a mobile client device, the location—or at least an approximate location—of that device needs to be identified. The location may be determined at the client device, for instance using GPS. The location may also be determined on the network side, for instance from an IP address of the client device, by triangulating wireless signals or other techniques.

However, as the client device moves and its location changes, it may be difficult to provide location-appropriate responses to client queries. For instance, in the situation where the client device determines its location, that location may be stored in a cookie. The cookie may be used with a future search, but at the time a current search query is submitted current location information is not available. Thus, since the web server is not aware of the current location information the location-sensitive search results may already be stale when received at the client device's web browser.

One solution is to reload the webpage in the browser to refresh the results with the current location. However, this would significantly increase (e.g., double) the latency. It would also increase the amount of processing performed on both the client device and web server. And for the client device, it may adversely affect battery life. Thus, automatically refreshing the browser in this manner may not be the most efficient approach in many circumstances.

BRIEF SUMMARY

Aspects of the technology involve determining whether the results for a query or the webpage itself would change as a result of a change in the location of the client device. In one scenario, the old (prior) location of the client device is available in a cookie at the client device. This is the location used when rendering the current webpage. When the webpage reloads, for instance in response to a new query, the web server will receive updated location information. The web server can measure the distance the client device has moved from the prior location based on the updated location information. Depending on how much the location change would affect the search results or the webpage, the relevant part or the entirety of the webpage may be refreshed.

According to one aspect of the technology, a method is provided that includes detecting, by a client device, a physical location of the client device; receiving, by one or more processors of the client device, an information query; generating, by the one or more processors, a search request in accordance with the information query; and transmitting, by a communication module of the client device, the search request and the detected location of the client device to a web server. The method also includes receiving, by the communication module, a response to the search request and a location signal. The response includes location-selected search results based on the detected location of the client device. The location signal indicates whether the detected location is within a threshold distance from a previously detected location of the client device. The method also includes determining, by the one or more processors in accordance with the location signal, whether to refresh the received search results, to refresh an entire webpage, or to not refresh either the received search results or the entire webpage.

In one example, the method further includes, prior to the detecting, receiving, by the one or more processors, an initial information query; generating, by the one or more processors, an initial search request in accordance with the information query; transmitting, by the communication module of the client device, the initial search request to the web server; and receiving, by the communication module, a response to the initial search request and a location request. The location request may direct the client device to detect the physical location of the client device. The response to the initial search request may include initial search results based upon an estimated location of the client device.

In another example, in response to the determining, the client device requests refreshed search results from the web server. And in a further example, in response to the determining, the client device refreshes the entire webpage for presentation on a display of the client device.

According to another aspect of the technology, a method is provided that includes receiving, by one or more processing devices of a web server, a search request and location information from a client device. The location information includes a detected physical location of the client device. The method also includes comparing, by the one or more processing devices, the received detected physical location of the client device against a previously received physical location of the client device in accordance with a threshold value. In response to the comparison, the method generates a location signal that indicates whether a distance between the received detected physical location and the previously received physical location is greater or lesser that the threshold value. Search results are generated in response to the search request according to the received location information, and the generated search results are transmitted to the client device for presentation to a user of the client device along with the generated location signal.

In one example, the threshold value is a predetermined value. In another example, the threshold value is variable in accordance with one or more factors including a density of search results, a user click pattern, and a volume of received refresh requests.

According to one alternative, the method also includes receiving a request from the client device to refresh the generated search results. Here, the request to refresh the generated results may be provided in accordance with the generated location signal.

In another alternative, the transmitting further including transmitting a location request. The location request directs the client device to detect the physical location of the client device. In a further alternative, the previously received physical location of the client device is stored in a memory by the web server.

According to yet another aspect of the technology, a client device is provided that has a user interface module including one or more user input devices configured to receive user input, a processing module including one or more processors, a memory module having one or more memories configured to store data and instructions for execution by the processing module, and a communication module including a wireless transceiver configured for bidirectional communication with one or more remote devices. The processing module is operatively coupled to the user interface module, memory module and the communication module. The processing module is configured to detect a physical location of the client device, receive an information query via the user interface module, generate a search request in accordance with the information query and transmit, via the communication module, the search request and the detected location of the client device to a web server. The processing module is also configured to receive, via the communication module, a response to the search request and a location signal. The response includes location-selected search results based on the detected location of the client device. The location signal indicates whether the detected location is within a threshold distance from a previously detected location of the client device. The processing module is further configured to determine, in accordance with the location signal, whether to refresh the received search results, to refresh an entire webpage, or to not refresh either the received search results or the entire webpage.

In one scenario, the processing module is further configured, prior to the detecting, to receive, via the user interface module, an initial information query; generate an initial search request in accordance with the information query; transmit, via the communication module, the initial search request to the web server; and receive, via the communication module, a response to the initial search request and a location request.

In one example, the location request directs the client device to detect the physical location of the client device. In another example, in response to the determining, the client device either requests refreshed search results from the web server, or refreshes the entire webpage for presentation on a display of the client device.

And in accordance with a further aspects of the technology, a server system is provided, which comprises a processing module including one or more processors, a memory module having one or more memories configured to store data and instructions for execution by the processing module, and a communication module including a wireless transceiver configured for bidirectional communication with one or more remote devices including one or more wireless stations and one or more client devices. The processing module is operatively coupled to the memory module and the communication module, and is configured to receive, via the communication module, a search request and location information from a client device. The location information includes a detected physical location of the client device. The processing module is also configured to compare the received detected physical location of the client device against a previously received physical location of the client device in accordance with a threshold value, and in response to the comparison, generate a location signal that indicates whether a distance between the received detected physical location and the previously received physical location is greater or lesser that the threshold value. The processing module is further configured to generate search results in response to the search request according to the received location information, and to transmit, via the communication module, the generated search results to the client device for presentation to a user of the client device along with the generated location signal.

In one scenario, the threshold value is variable in accordance with one or more factors including a density of search results, a user click pattern, and a volume of received refresh requests. In another scenario, the processing module is further configured to receive, via the communication module, a request from the client device to refresh the generated search results, in which the request to refresh the generated search results is provided in accordance with the generated location signal. And in a further scenario, the processing module is configured so that the transmission of the generated search results includes transmitting a location request directing the client device to detect the physical location of the client device.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

FIG. 1B illustrates an example location-relevant web browser search process according to aspects of the disclosure.

The following description is based on embodiments of the claims and should not be taken as limiting the claims with regard to alternative embodiments that are not explicitly described herein.

DETAILED DESCRIPTION

Overview

The approach discussed herein allows the system to selectively update one or more portions of a webpage and search results when it is determined that the location of a client device has changed.

Figure 1A:
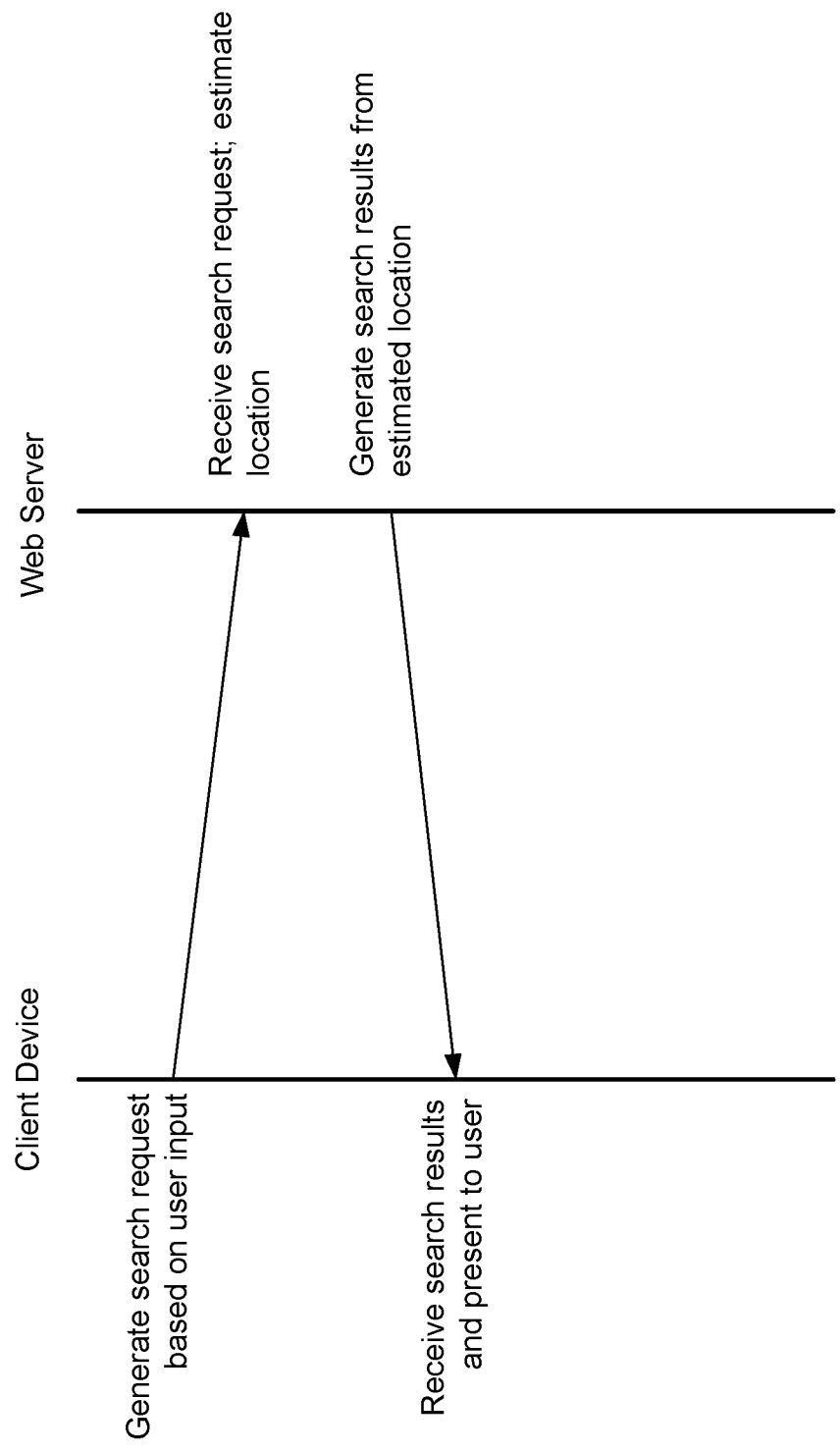
FIG. 1A illustrates a conventional web browser search process.

First, a conventional approach shown in FIG. 1A. Here, when the web browser of a client device generates a search request or other query based on user input, that query is transmitted to a web server. The web server estimates a location of the client device, for instance via IP address reverse geolocation, or based on a previously determined location by the client device. In response to this estimated location, the web server determines possible search results and selects one or more results that are returned to the client device. Upon receipt, the results are presented to a user of the client device. This process may be repeated each time a search query is generated.

As noted above, it is possible to reload the webpage on the client device every time a new location is determined. However, this adds latency and adversely impacts processor and battery resources, in addition to increasing network traffic that can impact other client devices and the network overall. The selective updating approach discussed herein avoids such issues while providing location relevant information to the user of the client device.

One example of this is shown in FIG. 1B, which illustrates aspects of the present technology. Here, the client device may generate an initial search request based on user input. At this point, the client device may not have any location information or such information may be stale and unreliable. For instance, the last know location may have been determined 10 minutes ago, an hour ago, a day ago, etc. In any event, the query is transmitted to the web server. Upon receipt of the query, the web server estimates an initial location of the client device and generates a response to the query based on that estimated initial location.

When the response is sent to the client device, a location request is attached or possibly sent separately. In addition to presenting the results to the user, the client device also acts on the location request. As discussed in more detail below, the location information may be stored by the client device as a cookie. Then when a new search request is generated, the location information of the cookie is included as part of the new search request.

When the web server receives the new request, it is able to parse the received location information and use it to formulate a response to the request. Note that, as above, this location information may be stale and not reflect the current location of the client device. Nonetheless, the response based on such location information is provided to the client device along with another location request. The client device acts on this location request and updates or replaces the cookie to include the most current information.

At this point, as shown in FIG. 1B a further search request is generated. The location information of the cookie is included as part of the further search request. Here, the web server is able to evaluate whether there is any change in the location information. If so, the amount of change is analyzed and it is determined from the amount of change whether to change the results or otherwise partially or fully refresh the webpage. The location difference can be analyzed also at the client device or the web server to determine if a change of results is warranted.

Example Arrangement

Figure 2A:
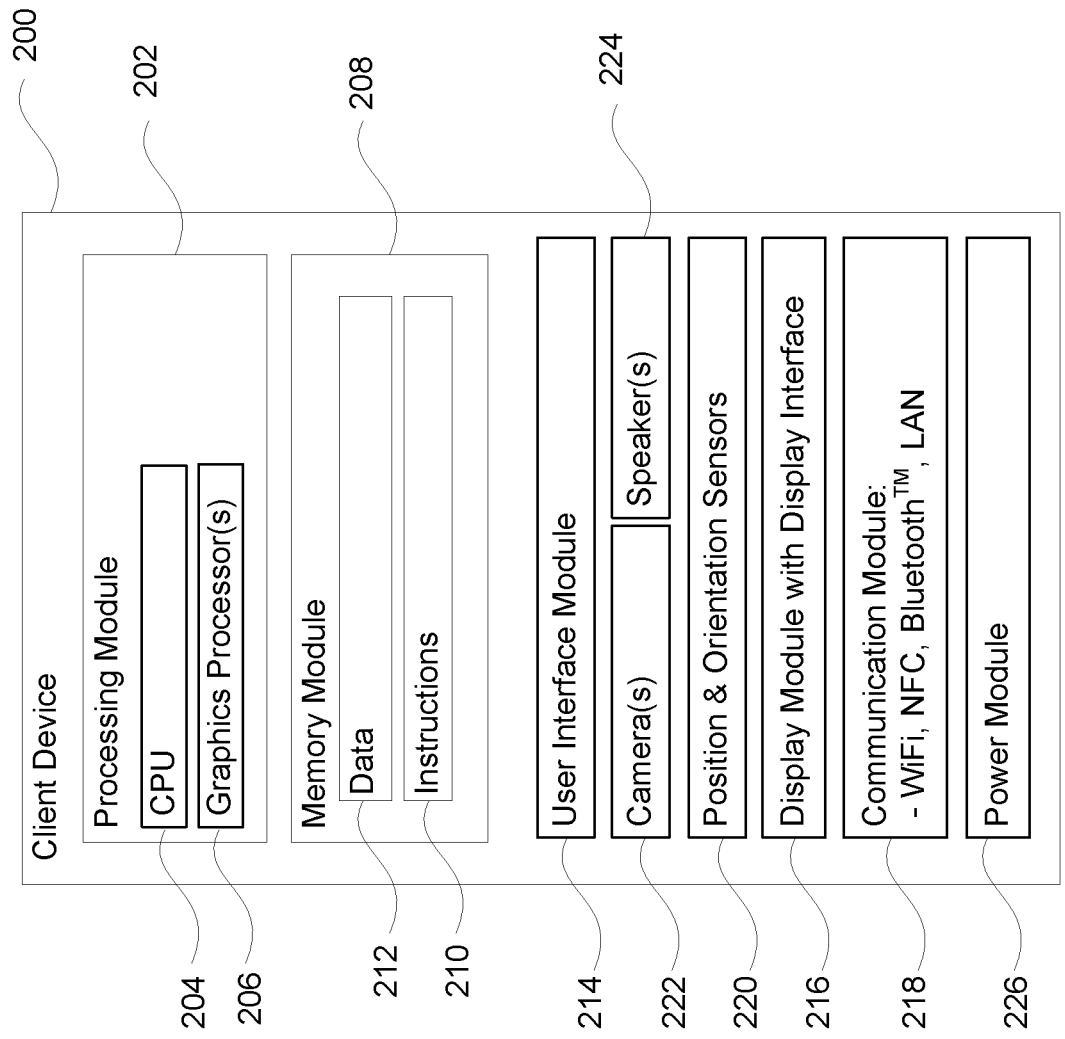
FIG. 2A is an example client communication device configured to implement the location-relevant search process in accordance with aspects of the disclosure.

FIG. 2A illustrates an example client device 200 that may be employed with the techniques disclosed herein. As shown, the device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user interface module may link to a web browser (not shown). The user inputs may include one or more of a touch screen, keypad, mouse, stylus, microphone, or other types of input devices. The display module 216 may comprise appropriate circuitry for driving the display device to present graphical and other information to the user. By way of example, the graphical information may be generated by the graphics processor(s) 206, while CPU 204 manages overall operation of the client device 200. The graphical information may display responses to user queries on the display module 216. For instance, the processing module may run a browser application or other service using instructions and data stored in memory module 208, and present information associated with the browser application or other service to the user via the display module 216. The memory module may include a database or other storage for browser information, location information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVD, CD-ROM, write-capable, and read-only memories. In one implementation, a computer program product is tangibly embodied in an information carrier. The computer program product contains instructions, such as instructions 210 that, when executed by one or more processors, perform one or more methods such as those described herein. The instructions may also instantiate the web browser. The information carrier is a computer- or machine-readable medium, such as memory module 208. Although FIG. 2A functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2A, the client device 200 includes a communication module 218 for communicating with other devices and systems, including a web server. The communication module 218 includes a wireless transceiver; alternatively, the module may include a wired transceiver. The client device 200 may communicate with other remote devices via the communication module 218 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown includes one or more position and orientation sensors 220. The position and orientation sensors 220 are configured to determine the position and orientation of client computing device 100. For example, these components may include a GPS receiver to determine the device's latitude, longitude and/or altitude as well as an accelerometer, gyroscope or another direction/speed detection device. The client device 200 may also include one or more camera(s) 222 for capturing still images and recording video streams, speaker(s) 224 and a power module 226, as well as actuators (not shown) to provide tactile feedback or other information to the user.

Figure 2B:
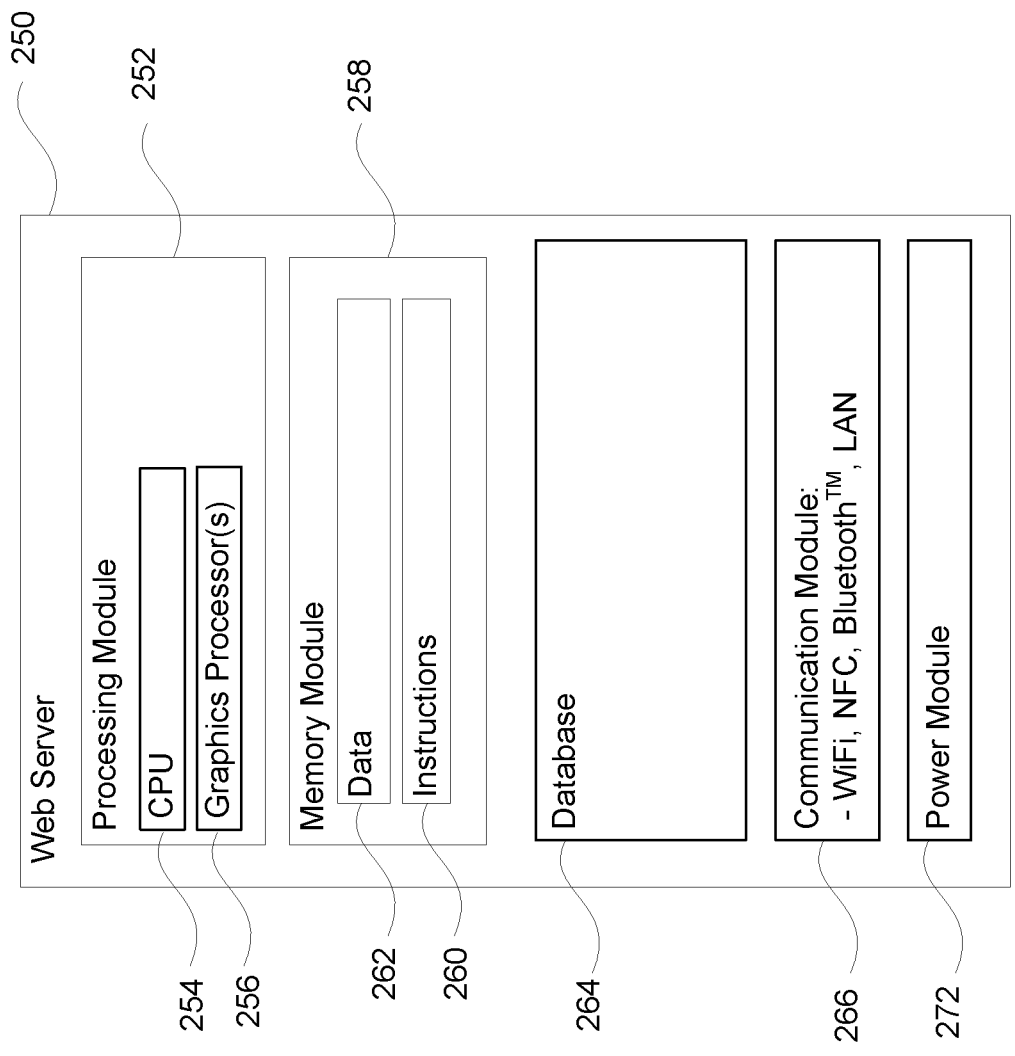
FIG. 2B is an example web server configured to implement the location-relevant search process in accordance with aspects of the disclosure.

FIG. 2B illustrates an example web server 250 that may be employed with the techniques disclosed herein. As shown, the web server 250 includes various components similar to those described above for the mobile client device 200. For instance, the web server includes a processing module 252 having one or more computer processors such as a central processing unit 254 and/or graphics processors 256, as well as memory module 258 configured to store instructions 260 and data 262. The processors may or may not operate in parallel, and may include ASICs, controllers and other types of hardware circuitry.

As with memory module 208, memory module 258 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 258 may also include DVDs, CD-ROMs, high-density tape drives, and other types of write-capable or read-only memories. In one implementation, a computer program product is tangibly embodied in an information carrier. The computer program product contains instructions, such as instructions 260 that, when executed by one or more processors, perform one or more methods such as those described herein. The information carrier is a computer- or machine-readable medium, such as memory module 208. Although FIG. 2B functionally illustrates the processor(s), memory module, and other elements of web server 250 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 262 of memory module 258 may be retrieved, stored or modified by the processors in accordance with the instructions 260. For instance, although the claimed subject matter is not limited by any particular data structure, the data may be stored in computing device registers, in a relational database as a table having a plurality of different fields and records, XML documents or flat files. The data may also be formatted in any computing device-readable format. As with instructions 210, the instructions 260 may be any set of instructions to be executed directly (such as machine code) or indirectly (such as scripts) by the processor(s), and the above discussion of instructions 210 applies to instructions 260 as well.

By way of example, the processors of the processing module 252 may be arranged in a distributed architecture. In a distributed architecture, the web server 250 may comprise multiple server units, for instance in a cloud computing arrangement. Whether in an inclusive or distributed architecture, the processors are operatively coupled to database 264. The database 264 may include information used to provide results to search queries, such as imagery, information about places of interest, advertising content, etc. Such information may be stored in multiple discrete databases. The databases may be distributed, for instance across multiple memory modules or other storage devices of a cloud computing architecture.

As also shown in FIG. 2B, the web server 250 includes a communication module 266 for communicating with other devices and systems, including with client devices and other elements in the network. The communication module 266 includes a wireless transceiver. The communication module 266 may also include a wired transceiver in addition to or in place of the wireless transceiver. The web server 250 may communicate with other remote devices via the communication module 270 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing. In addition, the web server 250 as shown includes a power module 272. Other system elements, including computer components shown in FIG. 2A, may also be included within the web server 250.

Figure 3:
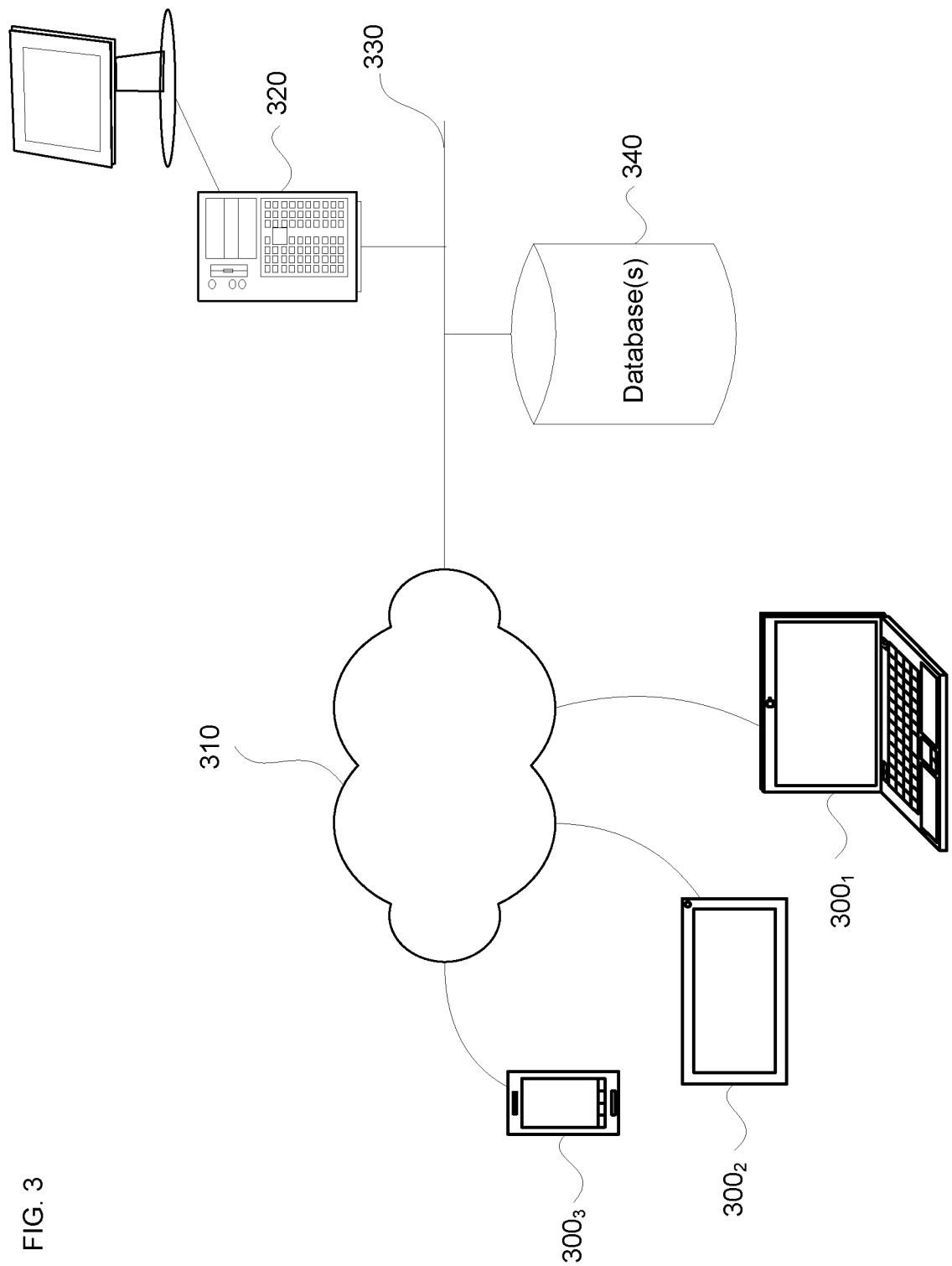
FIG. 3 illustrates an example network in accordance with aspects of the disclosure.

FIG. 3 illustrates an example arrangement in which different client devices 300, e.g., $300_1$, $300_2$ and $300_3$ may request content or other information from servers 320, such as web servers, via communication system 310. The client devices 300 may include some or all of the components discussed above with regard to client device 200. The client devices may include laptops ($300_1$), tablets ($300_2$), cellular phones or PDAs ($300_3$) and the like. However, other client devices, including wearable electronics such as smart watches and head-mounted displays, may also be employed. Any such client device may send requests as shown in FIG. 1B and receive targeted results from the network as disclosed herein.

By way of example only, the requests may be parsed and routed to one or more servers on the network. While one server 320 is shown, the functionality of the services provided herein may be performed by one or more servers or other computer systems, such as a cloud computing network. The requests, location information and corresponding responses may be passed via bus 330. One or more databases 340 may be used by the services to serve response to client device queries.

Example Methods and Use Cases

As noted above, features of the technology can be implemented in various use cases. Example use cases are discussed below.

In one use case, the user may request information via a web browser on the client device. By way of example, the information could be about a point of interest such as a restaurant, coffee shop, car dealership, museum, etc. Other use cases may involve on-line shopping or other order placement. The user may also request information about bus time tables, house rentals, tourist points of interest, menus, etc. Still other use cases may involve on-line shopping or other order placement. Further examples may include map or direction queries. Nonetheless, the technology is query-agnostic.

Figure 4:
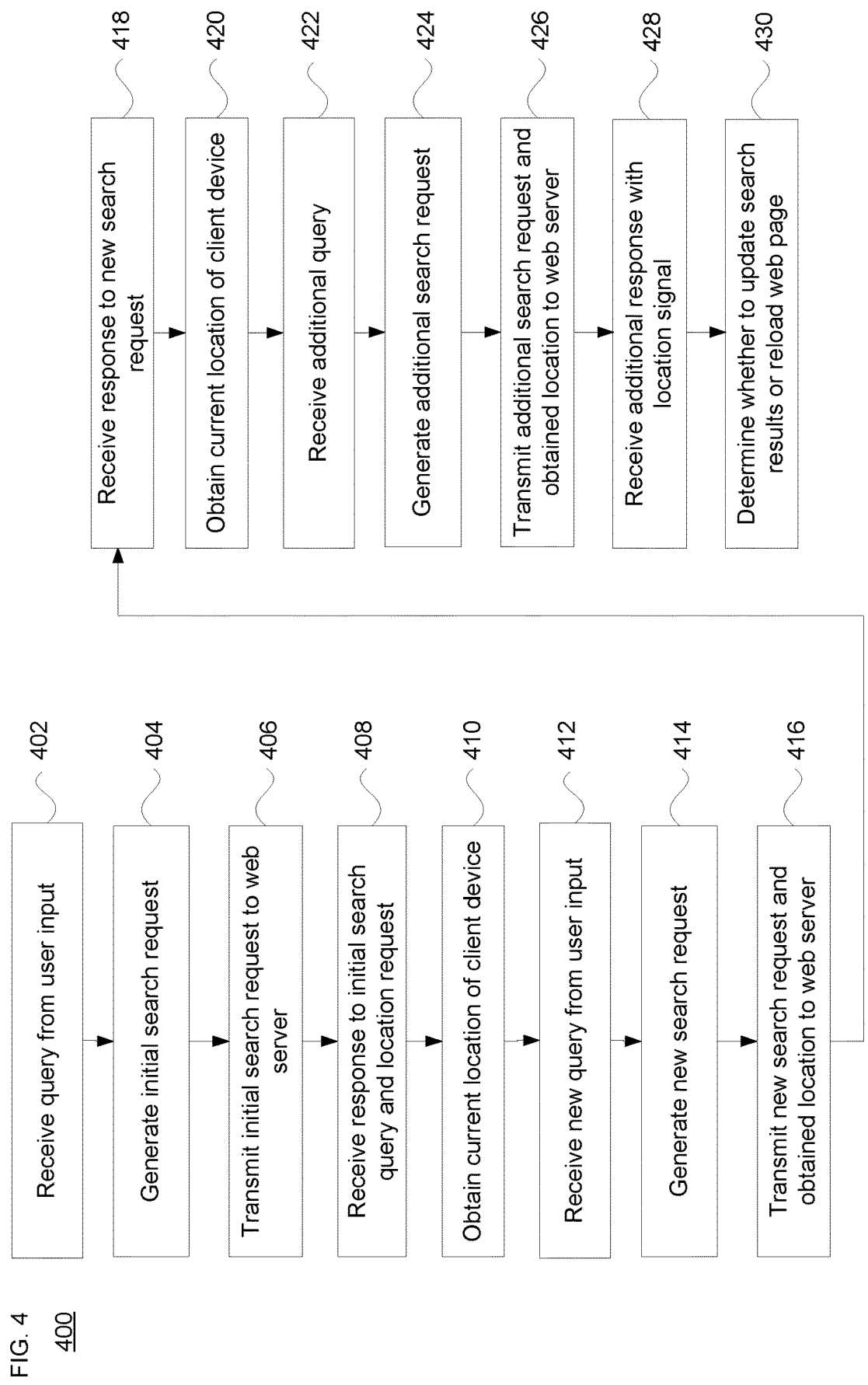
FIG. 4 illustrates features of a process in accordance with aspects of the disclosure.

Regardless of the type of query, the browser of the client device is configured to send the query to the network via the communication module of the client device. One example scenario is shown in relation to flow diagram 400 of FIG. 4. Here, in block 402 a query is received from user input via the user interface module. At block 404, one or more processors of the client device generate an initial search request via the web browser in accordance with the received query. At this point, per block 406, the initial search query is transmitted to a web server, such as web server 250 of FIG. 2B, via the communication module.

Per block 408, the communication module receives the response to the initial search query. The response may include search results, images and other information that may be presented on a webpage via the display module and display interface of the client device. As noted above, the web server may estimate the location of the client device in order to provide location-relevant search results. The received response also includes a location request from the web server. The processing module may use an application program interface (API) in conjunction with the position and orientation sensor module, for instance a geolocation JavaScript API, in order to obtain the current location of the client device, as shown in block 410. The current location may be stored in memory of the client device, for instance as information associated with a cookie.

Next, in block 412 a new query is received from user input via the user interface module. At block 414, the one or more processors of the client device generate a new search request via the web browser in accordance with the received query. At this point, per block 416, the new search query is transmitted to the web server along with the obtained location of the client device.

Similar to the process described above, per block 418 the communication module receives the response to the new search request. Here, the new response has been prepared based on the obtained location. This new received response also includes a location request from the web server. In response to the new location request, the current location of the client device is obtained as shown in block 420. The current location may be the same or different from the previously obtained location depending on whether the client device has been moved. This new location may be stored in memory of the client device, for instance as information associated with a cookie. In one example, the new location may replace the previously stored location.

Then at block 422 an additional query is received from user input via the user interface module. At block 424, the one or more processors of the client device generate an additional search request via the web browser in accordance with the received query. At this point, per block 426, the new search query is transmitted to the web server along with the current location of the client device. Then at block 428 the communication module receives the response to the additional search query. A location signal may also be included from the web server. Here, the new response has been prepared based on the most current obtained location. As will be discussed further below, based on the information received from the web server, including the location signal, the system may determine whether to update the search results or other portions of the webpage, or reloading the webpage entirely as shown in block 430.

In one example, the location signal indicates that the different between the prior detected location and the most recent location provided to the web server is small and falls within a given threshold. In this case, the client device does not request a refresh of the search results and does not refresh the web page. Here, if there is a map presented to the user as part of the displayed web page, the current location of the client device on the map may be illustrated or updated at this point.

In contrast, when the location signal indicates that the difference is large and falls outside the given threshold, the results are refreshed. This may be done by sending a further query to the web server. The refreshing may involve just refreshing the search results or the entire web page. For instance, when it is determined that only the local results are affected because of the change in location, the refreshing may be limited to the search results. And when it is determined that the web results overall would change, the full web page would be reloaded. According to one example, if there is one webpage for a given city, the web page would not be reloaded if the client device is still found to be in that city. If the client device's current location turns out to be in a different place, then the webpage would be reloaded. Based on this, the client device presents selected search results and other information to the user via the display module of the client device.

This approach minimizes the amount of requests that are sent to the web server and the burden on both the client device and the web server.

Figure 5:
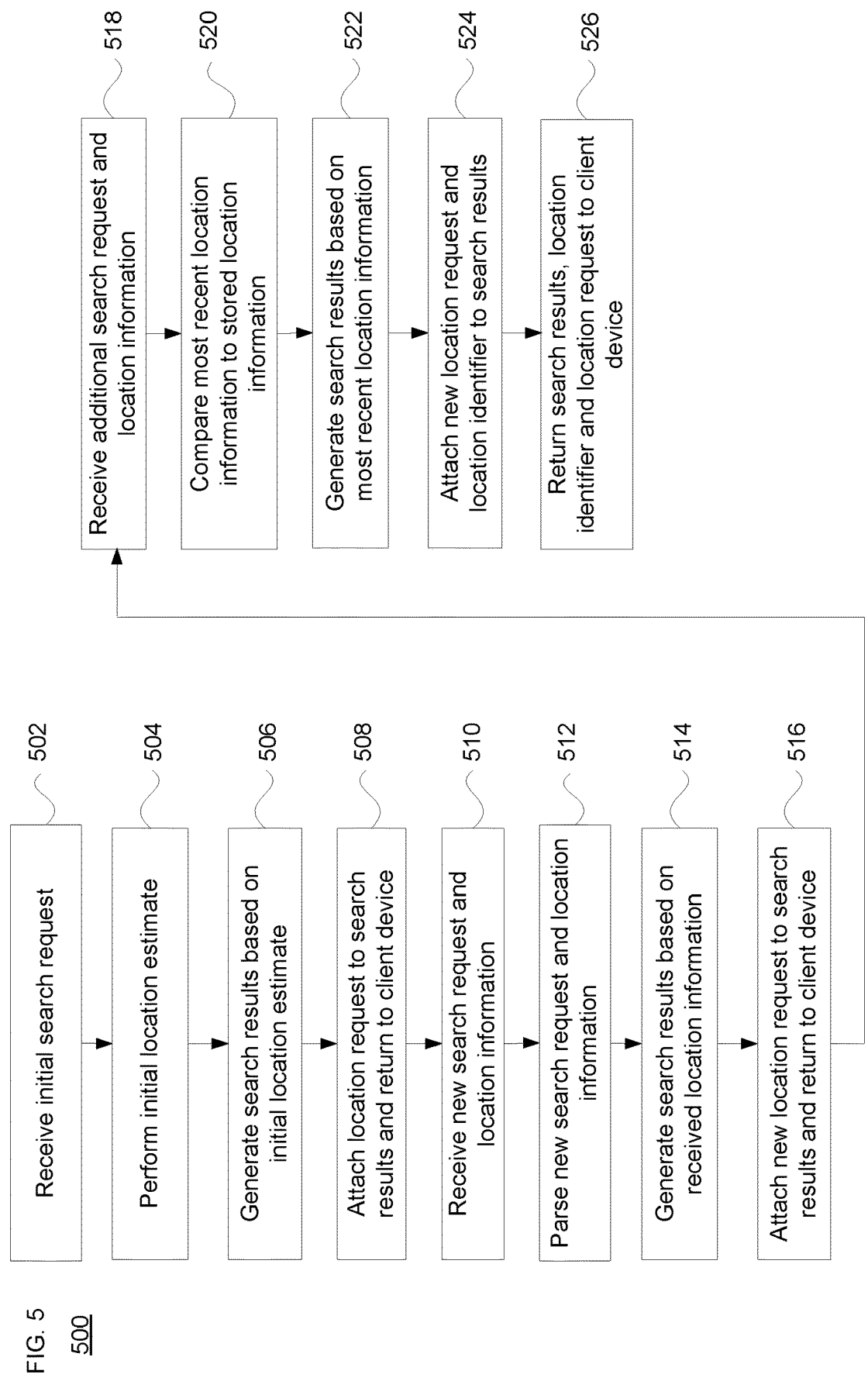
FIG. 5 illustrates features of a process in accordance with aspects of the disclosure.

Turning to FIG. 5, this figure illustrates an example process 500 in which the web server receives and processes the search request. As shown in block 502, an initial search request is received from the client device. At block 504, an initial location estimate for the initial search request is performed. This may be done by the web server itself, or by a location service associated with the web server. Determining the initial location estimate may involve identifying a location in accordance with the IP address from which the initial search request is received. Then at block 506 the web server generates a set of search results based on the initial location estimate. At block 508, the web server attaches a location request to the search results. The location request and search results are transmitted back to the client device. Alternatively, the location request may be sent to the client device separately from the search results.

Subsequently, the web server receives a new search request from the client device at block 510. Here, because the location request was previously transmitted, the new search request is accompanied by location information of the client device. This location information may or may not be current, depending on whether the client device has moved since the location information was obtained.

At block 512, the web server parses the search request and location information. The location information is stored, for instance in database 264 of FIG. 2B, or some other type of memory. At block 514, the web server generates a set of search results based on the received location information. At block 516, a new location request is attached to these search results, which are returned to the client device.

At some later point in time, the web server receives an additional search request from the client device at block 518. Here, because the location request was previously transmitted at block 516, the additional search request is accompanied by location information of the client device. As with block 510, this location information may or may not be current, depending on whether the client device has moved since the location information was obtained.

Then at block 520 the web server compares the most recently received location information against the location information that was previously received. As noted above with regard to FIG. 4, the difference (delta) between the prior location information and the current location information is evaluated to see whether it is less than or greater than a threshold value. When the difference is within the threshold, then it is determined that the location change is small enough to not affect location-relevant search results or other information presented on the client device web page. In contrast, when the difference falls outside the threshold, the location change may have some effect on this information. Based on the results of this comparison, a location signal is generated by the web browser. The location signal may be a simple Boolean identifier or other information.

The threshold value may be predetermined and set to a particular radius, for instance 1 km, 2 km or more or less. The threshold value may also be variable depending on different factors. For instance, the density of results can affect the threshold value. In one example, there may be 5 coffee houses within the region of interest, such as a neighborhood of a city. In this case, the threshold value may be reduced to a few hundred meters (or more or less). Or there may only be 1 hardware store or furniture store in the entire city. Here, the threshold value may be increased to 10 km (or more or less). Another factor may be user click patterns, including how often results are clicked or how many different results are clicked. Yet another factor may be how often the process triggers a request to refresh the results. The system may increase or decrease the threshold value in response to any combination of such factors.

At block 522, search results are generated based on the most recent location information received from the client device. The location signal is attached to the search results at block 524. A new location request may also be included. Then at block 526 this information is returned to the client device.

The web server may also make the determination on whether the search results or the entire web page should be reloaded. This could potentially further reduce the amount of data traffic transmitted between the web server and the client device. In this situation, there would be no need to send the location identifier to the client device. For instance, when the different between the prior detected location and the most recent location provided to the web server is small and falls within a given threshold, no refresh of the search results or the web page would be initiated. When analysis by the web server indicates that the difference is large and falls outside the given threshold, the web server may initiate refreshing of the results. And when it is determined that the web results overall would change, the web server may initiate reloading of the full web page.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
   detecting, by a client device, a physical location of the client device;
   receiving, by one or more processors of the client device, an information query;
   generating, by the one or more processors, a search request in accordance with the information query;
   transmitting, by a communication module of the client device, the search request and the detected location of the client device to a web server;
   receiving, by the communication module, a response to the search request and a location signal, the response including location-selected search results displayed on the client device and based on the detected location of the client device, the location signal indicating whether the detected location is within a first threshold distance from a previously detected location of the client device; and
   determining, by the one or more processors in accordance with the location signal, whether to refresh a portion of a display of the client device based on whether a difference between the detected location device and the previously detected location of the client device meets the first threshold distance, including:
      determining, when a first difference between the detected location device and the previously detected location of the client device is less than the first threshold distance, not to refresh either the displayed search results or a display of an entire webpage that includes the displayed search results;
      determining, when a second difference between the detected location device and the previously detected location of the client device is greater than the first threshold distance, whether to refresh the displayed search results or the display of the entire webpage; and
      refreshing the display of the entire webpage when the second difference is greater than a second threshold distance, the second threshold distance being greater than the threshold distance.

2. The method of claim 1, further comprising prior to the detecting:
   receiving, by the one or more processors, an initial information query;
   generating, by the one or more processors, an initial search request in accordance with the information query;
   transmitting, by the communication module of the client device, the initial search request to the web server; and
   receiving, by the communication module, a response to the initial search request and a location request.

3. The method of claim 2, wherein the location request directs the client device to detect the physical location of the client device.

4. The method of claim 2, wherein the response to the initial search request includes initial search results based upon an estimated location of the client device.

5. The method of claim 1, wherein, in response to the determining, the client device requests the displayed search results to be refreshed from the web server.

6. The method of claim 1, wherein in response to the determining, the client device refreshes the display of the entire webpage for presentation on the display of the client device.

7. A method comprising:
   receiving, by one or more processing devices of a web server, a search request and location information from a client device, the location information including a detected physical location of the client device;
   comparing, by the one or more processing devices, the received detected physical location of the client device against a previously received physical location of the client device in accordance with a threshold value;
   in response to the comparison, generating a location signal that indicates whether a distance between the received detected physical location and the previously received physical location is greater or lesser than the threshold value;
   generating search results in response to the search request according to the received location information;
   transmitting the generated search results to the client device for presentation to a user of the client device along with the generated location signal; and
   receiving a request from the client device to refresh a portion of a display of the client device, wherein:
      when the distance is a first difference between the received detected physical location and the previously received physical location of the client device is, the first difference being greater than the threshold value, the request is to refresh a display of the generated search results; and when the distance is a second difference between the received detected physical location and the previously received physical location of the client device, the second difference being greater than the threshold value, the request is to refresh a display of an entire webpage including the displayed search results, the second difference being greater than a second threshold value, the second threshold value being greater than the threshold value; and refreshing the display based on the request.

8. The method of claim 7, wherein the threshold value is a predetermined value.

9. The method of claim 7, wherein the threshold value is variable in accordance with one or more factors including a density of search results, a user click pattern, and a volume of received refresh requests.

10. The method of claim 7, wherein the previously received physical location of the client device is stored in a memory by the web server.

11. The method of claim 7, wherein the transmitting further includes transmitting a location request, wherein the location request directs the client device to detect the physical location of the client device.

12. A client device, comprising:
a user interface module including one or more user input devices configured to receive user input;
a processing module including one or more processors;
a memory module having one or more memories configured to store data and instructions for execution by the processing module; and
a communication module including a wireless transceiver configured for bidirectional communication with one or more remote devices;
wherein the processing module is operatively coupled to the user interface module, memory module and the communication module, and the processing module is configured to:
detect a physical location of the client device;
receive an information query via the user interface module;
generate a search request in accordance with the information query;
transmit, via the communication module, the search request and the detected location of the client device to a web server;
receive, via the communication module, a response to the search request and a location signal, the response including location-selected search results displayed on the client device and based on the detected location of the client device, the location signal indicating whether the detected location is within a first threshold distance from a previously detected location of the client device; and
determine, in accordance with the location signal, whether to refresh a portion of a display of the client device based on whether a difference between the detected location device and the previously detected location of the client device meets the first threshold distance, including:
determining, when a first difference between the detected location device and the previously detected location of the client device is less than the first threshold distance, not to refresh either the displayed search results or a display of an entire webpage that includes the displayed search results; and determining, when a second difference between the detected location device and the previously detected location of the client device is greater than the first threshold distance, whether to refresh the displayed search results or the display of the entire webpage; and the display of the entire webpage when the second difference is greater than a second threshold distance, the second threshold distance being greater than the threshold distance.

13. The client device of claim 12, wherein the processing module is further configured, prior to the detecting, to:
receive, via the user interface module, an initial information query;
generate an initial search request in accordance with the information query;
transmit, via the communication module, the initial search request to the web server; and
receive, via the communication module, a response to the initial search request and a location request.

14. The client device of claim 13, wherein the location request directs the client device to detect the physical location of the client device.

15. The client device of claim 13, wherein, in response to the determining, the client device either requests the displayed search results to be refreshed from the web server, or refreshes the display of the entire webpage for presentation on a display of the client device.

16. A server system, comprising:
a processing module including one or more processors;
a memory module having one or more memories configured to store data and instructions for execution by the processing module; and
a communication module including a wireless transceiver configured for bidirectional communication with one or more remote devices including one or more wireless stations and one or more client devices;
wherein the processing module is operatively coupled to the memory module and the communication module, and is configured to:
receive, via the communication module, a search request and location information from a client device, the location information including a detected physical location of the client device;
compare the received detected physical location of the client device against a previously received physical location of the client device in accordance with a threshold value;
in response to the comparison, generate a location signal that indicates whether a distance between the received detected physical location and the previously received physical location is greater or lesser than the threshold value;
generate search results in response to the search request according to the received location information;
transmit, via the communication module, the generated search results to the client device for presentation to a user of the client device along with the generated location signal; and
receive, via the communication module, a request from the client device to refresh a portion of a display of the client device, wherein:
when the distance is a first difference between the received detected physical location and the previously received physical location of the client device, the first difference being greater than the threshold value, the request is to refresh a display of the generated search results; and when the distance is a second difference between the received detected physical location and the previously received physical location of the client device, the second difference being greater than the threshold value, the request is to refresh a display of an entire webpage including the displayed search results, the second difference being greater than a second threshold value, the second threshold value being greater than the threshold value.

17. The server system of claim 16, wherein the threshold value is variable in accordance with one or more factors including a density of search results, a user click pattern, and a volume of received refresh requests.

18. The server system of claim 16, wherein the processing module is configured to transmit the generated search results with a location request, the location request directing the client device to detect the physical location of the client device.

\* \* \* \* \*